United States Patent

[11] 3,589,116

[72] Inventor: Ralph W. Speiser, Minneapolis, Minn.
[21] Appl. No.: 785,423
[22] Filed: Oct. 17, 1968
Division of Ser. No. 390,704, Aug. 19, 1964, Pat. No. 3,410,063
[45] Patented: June 29, 1971
[73] Assignee: Toro Manufacturing Corporation, Minneapolis, Minn.

[54] REEL MOWER WITH ADJUSTABLE SUPPORT
18 Claims, 4 Drawing Figs.

[52] U.S. Cl. ................................................. 56/249
[51] Int. Cl. ................................................. A01d 55/20
[50] Field of Search ............................ 56/7, 26, 249, 294, 249.5, 250—254, 208, 210, 214

[56] References Cited
UNITED STATES PATENTS

| | | | |
|---|---|---|---|
| 2,646,658 | 7/1953 | Dunham | 56/249 |
| 2,779,145 | 1/1957 | Smith | 56/25 |
| 2,875,568 | 3/1959 | Watamaker | 56/210 |
| 2,910,816 | 11/1959 | McCarty et al. | 56/25 |
| 3,021,660 | 2/1962 | Huseman | 56/210 |
| 3,110,146 | 11/1963 | Latshaw | 56/25 |
| 3,168,800 | 2/1965 | Dyrdahl | 56/210 |
| 3,417,555 | 12/1968 | Watkins et al. | 56/208 |
| 1,944,584 | 1/1934 | Stegeman et al. | 56/7 |
| 2,013,597 | 9/1935 | Blydenburgh | 56/26 |
| 2,705,861 | 4/1955 | Mott | 56/249 |
| 3,049,851 | 8/1962 | Hargreaves et al. | 56/7 |

Primary Examiner—Russell R. Kinsey
Attorney—Vernon A. Johnson

ABSTRACT: A ground support for a mower which is adjustable so as to selectively vary the height of cut. The support includes a curved skid, the front end of which is hingedly connected to the mower frame for vertical swinging movement relative to the frame. The skid is held in selected positions by an upstanding, elongate, longitudinally adjustable rod, the lower end of which is pivotally connected with the skid, the upper end of which is detachably suspended from one of a series of detents attached to the frame.

PATENTED JUN29 1971

3,589,116

INVENTOR.
RALPH W. SPEISER
BY Thomas H. Lennon
ATTORNEY

REEL MOWER WITH ADJUSTABLE SUPPORT

This is a division of application Ser. No. 390,704, filed Aug. 19, 1964 now U.S. Pat. No. 3,410,063.

This invention relates to an improved multiple mowing unit traction mowing machine, and more particularly, to a machine in which the mowing units are grouped in overlapping relationship about a small and compact traction vehicle, and in which the mowing elements of each unit are operated from the power source on the traction vehicle and specifically to novel adjustable skid mechanism for said mowing units.

Riding lawn mowers suitable for institutional, commercial, or park use, or for use on estates and the like where large expanses of grass are to be cut, are commonly in widespread use, and a plurality of tractor-mounted reel mowers mounted in overlapping relation continues to provide a better answer for such uses.

Thus, it is the principal object of my invention to provide a riding vehicle and mower assembly, wherein several reel mowers are mounted in slightly overlapping relation to provide a wide-swath mowing configuration, and particularly to provide a novel, easy to operate, effective, adjustable skid mechanism for said reel mowers.

This and other objects of the invention will become apparent from a careful analysis of the specification and drawings, in which.

THE FRAME

Figures 1, 2, 3, 4:
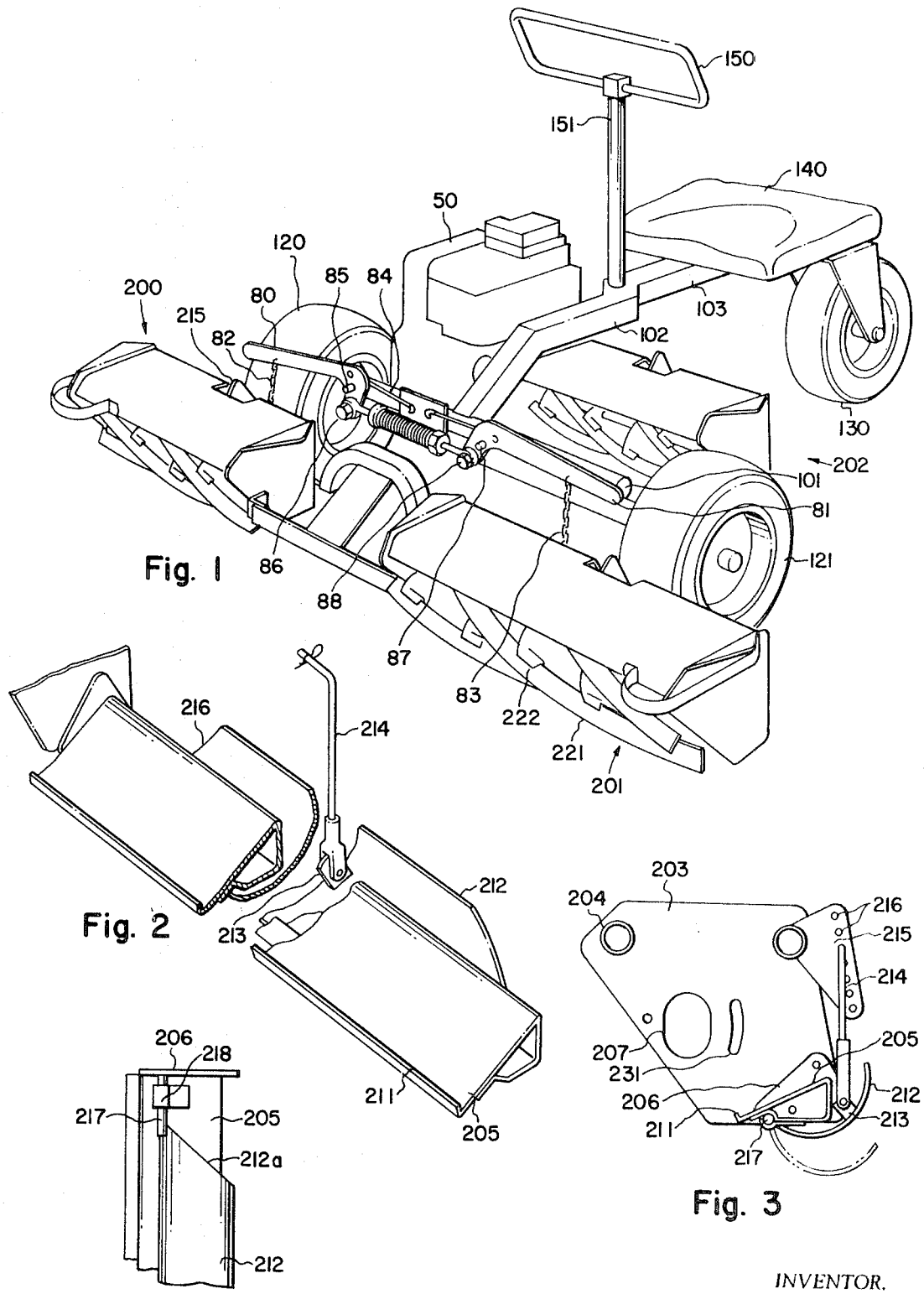
FIG. 1 is a perspective view of my overall machine, viewed from the left front corner.
FIG. 2 is a perspective view of my combined bed-knife and bed-bar arrangement, together with the full length skid and height of cut-adjusting device, all of which form a part of each complete reel mower unit.
FIG. 3 is a cross-sectional side view of one of my reel mower units viewed adjacent to the height of cut-adjusting apparatus.
FIG. 4 is a bottom view of a portion of one of my reel mower units.

A generally T-shaped main frame includes tubular cross member 101 and the base of the T consists of channel members 102 and 103 secured together by bolts or other suitable means as shown. The forward most portion of member 102 is downwardly curved as is best illustrated in FIG. 1 and welded at its forward end to crossmember 101. The rearward end of member 103 is supported by wheel 130 and the operator's seat 140 is mounted thereabove. The forward end of member 103 is provided with a suitable bushing or bearing (not shown) to receive upstanding shaft 151 of the steering assembly. The steering wheel or handle 150 is mounted at the upper end of shaft 151.

The forward portion of the vehicle is supported on wheels 120 and 121.

Three reel-mower assemblies 200, 201, and 202, which are substantially similar to one another, are provided. Reel-mower assembly 200 is positioned ahead of wheel 120, reel-mower assembly 201 is positioned ahead of wheel 121, and reel 202 is positioned ahead of wheel 130. Thus, during operation, grass is always mowed ahead of each wheel of the vehicle and this is effective to minimize the "tracking" that occurs with a typical reel mower wherein one or more wheels precedes the cutting reel. Furthermore, it will be noted that reel assemblies 200, 201, and 202 are not independently supported by means of wheels at either end, as is common in modern reel mowers, and my mower structure is therefore effective to eliminate the "tracking" that is inherent in the use of such independently wheeled reel-mowers.

THE REEL-MOWERS

The reels are constructed to include matching end plates 203 at either end. The end plates are held in spaced parallel relation by intermediate frame members 204 which are securely attached between end plates 203 either by welding directly as shown, or by means of suitable mounting brackets, and by my combined bed-knife and bed-bar 205 which is provided with integral mounting brackets 206 welded at either end. Suitable fastening devices such as screws or bolts are used to fasten members 203 and 206.

End plate 203 is provided with an opening 207, and a bearing plate is pivotally mounted to end plate 203 adjacent said opening by a bolt, which is sized so as to be somewhat smaller in diameter than the corresponding hole in the bearing plate. A bearing is carried by said bearing plate, and rotatably supports a reel shaft. The reel shaft and a portion of said bearing extend partially through the opening 207. This assembly is, of course, duplicated at each end of the overall reel-mower assembly.

The overall reel consists of said shaft, a plurality of spirally shaped blades 221, and a plurality of spiders 222, as shown, all of which are welded into an integral assembly and supported in the overall reel-mower assembly by bearing plates 208 as described. The reel-shaft is power-driven and the blades 221 rotate in close shearing fit with upstanding edge 211 of member 205.

Each of the reels is supported on the ground by means of a skid 212 which extends approximately the full width of the mower and is shaped in a generally arcuate configuration as is most clearly seen in FIG. 3. Each reel is provided with a height of cut adjustment assembly including a bracket 215 welded to intermediate frame member 204 at the approximate center thereof, and bracket 215 is provided with a series of holes 216, as shown. A lug 213 is welded to skid 212 in vertical relation with respect to bracket 215, and an adjusting rod 214 is pivotally mounted to lug 213 as shown. The height of cut is adjusted as is most clearly seen in FIG. 3 by moving the upper end of rod 214 vertically with respect to bracket 215, and inserting the upper end of rod 214 through the desired hole 216 and securing it with a cotter pin.

It should also be noted that the upper portion of rod 214 is preferably threaded into the pivotal base portion thereof, and it is therefore apparent that five micrometer-type height of cut adjustments may be made by rotating the rod in the base and thereby adjust the length of rod 214. As the height of cut adjustment is made, skid 212 pivots with respect to member 205 about pins 217 which are securely welded at either end of skid 212, and which are rotatably secured to bed-bar 205 by means of tabs 218 which are fastened to member 205 by means of capscrews. The leading edge of skid 212 is spaced slightly away from bed-bar 205 except at its extremities where pins 217 are in contact therewith. As a result, any ground shock on skid 212, resulting in deflection thereof is not transmitted directly to the relatively flexible central portion of bed-bar 205, but rather to the extremities thereof and thence directly into the reel-mower frame. This configuration is also advantageous in that it places the line of ground contact of the mower only very slightly to the rear of the cutting edge, especially at low heights of cut, as compared to a standard roller-type suspension, resulting in a more uniform cut over irregular ground. This feature is readily discernible in FIG. 3.

As will become apparent below, the hitch that is designed to attach the reel assemblies to the overall vehicle is effective to maintain the top edge of end plate members 203 in a substantially horizontal position for any height of cut and it is, therefore, apparent that adjustment of the height of cut mechanism of each reel will cause bed-knife 211 to be moved vertically with respect to the ground, thereby effectively changing the height of cut. Thus, it is apparent that I have shown an effective height of cut mechanism on a reel assembly that is simple and inexpensive to manufacture, and that none of the structure comes in contact with the grass until after it has been cut.

It should, also, be noted that the ends 212a of skid 212 are cut back at a rather sharp angle which is effective in the overall geometry of the vehicle to prevent the ends of the skids from plowing into the ground on turns. Thus, they are cut off diagonally inwardly at a rather sharp angle, as shown, along a line corresponding to the tangent of the arc described by the end of the mower during maximum turning of the vehicle.

A further feature of my machine, and one which is effective to place approximately 70 percent of the weight of the reel mower units and hitch assemblies on the wheels of the vehicle, is the simple, inexpensive and effective mechanism that is used to suspend the mower units from the basic wheeled frame. This suspension arrangement, with respect to the front mowers, is best seen in FIG. 1, and consists of cantilever arms 80 and 81, chains 82 and 83, and compression spring 84. Cantilever arm 80 is pivotally attached to frame member 101 by means of a pin 85 or other suitable means, and compression spring 84 is connected to the lower extremity of arm 80 by means of bolt 86. Similarly, arm 81 is pivotally attached to frame member 101 by means of pin 87, and the lower extremity of arm 81, is connected to the other end of compression spring 84 by means of bolt 88. Since spring 84 is located below pivot points 85 and 87, the longitudinal forces exerted by spring 84 are effective to force the lower extremities of the two cantilever arms 80 and 81 apart, thereby raising the outer ends of arms 80 and 81. This lifting action is thence carried to the reel mower assemblies 200 and 201, by means of chains 82 and 83, respectively, and by proper selection of the size of spring 84, I have found it possible to effectively transfer approximately 70 per cent of the weight of the two reel units and hitch assembly onto the wheels of the vehicle, thereby minimizing the weight of the reels on the turf. This tends to prevent turf damage by the full-length skid under the mower units, and also has the benefit of providing greater traction for the overall vehicle. It is, of course, essential to equalize the weight carried by chains 82 and 83, and to attach the chains on the intermediate frame number 204 of the reel-mower assemblies so as to maintain equal weight on either side of each chain, while maintaining a uniform pressure on the turf across the entire length of each reel-mower skid. This requires that a greater amount of weight be lifted at the inner end of each reel-mower than at the outer ends thereof, principally because of the weight of the connecting hitch and chain drive. In this connection, I have found it desirable to provide means (not shown) for adjusting spring 84 so as to regulate the total force exerted thereby. However, when these chains are properly positioned both with respect to arms 80 and 81, and with respect to the mower units 200 and 201, so as to equalize the affect of the weights and also so as to minimize the affect of the torque that is exerted as the reels of these mowers are power-driven, and when spring 84 is properly adjusted, I find that a very uniform ground pressure is achieved across the width of each mower, resulting in a uniform and even cut during operation of the machine.

While there has been described what is at present considered to be the preferred embodiment of this invention, it will be obvious to those skilled in-the-art that various changes and modifications may be made therein without departing from the invention and it is, therefore, aimed in the appended claims to cover all such modifications as fall within the true spirit and scope of the invention.

What I claim is:
1. A mower comprising:
a frame,
cutting means supported by said frame,
and ground-engaging supporting means for said frame,
said supporting means including a skid member attached to said frame and in sliding contact with the ground,
each end of said skid, beginning at the forward edge thereof, being cut off diagonally inwardly at an angle corresponding to a tangent of the arc described by the end of the mower during maximum turning thereof.
2. A mower comprising:
a frame,
cutting means supported by said frame,
and a ground-engaging support for said frame,
said support including a skid elongated transversely of the direction of travel and attached to said frame for sliding contact with the ground,
and wherein said mower is of the reel type,
and wherein said cutting means includes a plurality of spiral knives mounted on a rotatable shaft in close shearing fit with an assembly including a stationary bed-knife and supporting bed-bar,
and wherein the end portion of the leading edge portion of said skid are pivotally attached to said assembly,
the remainder of said skid being in spaced relationship with said assembly whereby ground pressure on said skid is transmitted to said assembly only at the extreme outer end portion thereof.
3. A mower comprising:
a frame,
cutting means supported by said frame,
a ground-engaging support for said frame,
said support including a skid elongated transversely of the direction of travel and attached to said frame for sliding contact with the ground,
means for adjusting said skid vertically relative to said frame to selectively vary the height of cut of said mower,
said adjusting means including a bracket supported by said frame, said bracket having a plurality of vertically spaced holes therein disposed above said skid,
and an elongate generally vertical rod having a lower end connected to said skid,
the upper end of said rod being selectively insertable in said holes to selectively vary the height of cut,
said rod being longitudinally adjustable.
4. The mower of claim 3 wherein said rod consists of two parts threadedly engaged in end-to-end relationship.
5. A reel mower comprising:
a frame,
cutting means supported by said frame, including a reel rotating about a horizontal axis and a bed-knife cooperating with said reel to cut grass therebetween,
a ground-engaging support for said frame,
said support including a skid elongated transversely of the direction of travel and attached to said frame for sliding contact with the ground,
said skid spanning substantially the entire width of said reel and constituting the sole ground support for said reel,
means for adjusting said skid vertically relative to said frame to selectively vary the height of cut of said mower,
said adjusting means being connected to the central portion of the skid as measured along the dimension of said skid disposed transversely of the direction of travel.
6. A reel mower comprising:
a frame,
cutting means supported by said frame including a reel rotating about a horizontal axis and a bed-knife cooperating with said reel to cut grass therebetween,
a ground-engaging support for said frame,
said support including a skid connected with said frame and in sliding contact with the ground,
and means for adjusting the relationship between said skid and said frame to selectively vary the height of cut of said mower.
7. A reel mower according to claim 6
wherein said adjusting means includes means for adjusting said skid vertically relative to said frame to selectively vary the height of cut of said mower.
8. The mower of claim 6 wherein said skid is pivotally connected with said frame for swinging movement about a horizontal axis transverse to the direction of travel,
the height of cut of said mower being varied in response to said swinging movement of said skid.
9. The mower of claim 6 wherein said adjusting means includes a plurality of vertically spaced first means disposed above said skid,
and second means connected with said skid and selectively engageable with said first means for varying the height of cut.
10. The mower of claim 6 wherein said adjusting means includes means extending between and rigidly connecting said frame and said skid, said connecting means including an element providing a vertical series of first means, said connecting means further including second means selectively engageable with said first means for holding said skid in different positions relative to said frame and thereby varying the height of cut of said mower.

11. A mower according to claim 6 including adjusting means interconnecting said frame and ground support for selectively varying the height of cut, said adjusting means including a plurality of vertically spaced first means disposed above said support, said adjusting means further including rod means pivotally connected with said ground support for selectively engaging said first means.

12. The mower of claim 11 wherein said rod means comprises two threadedly engaged parts, whereby changing the threaded relationship of said parts changes the position of said ground support relative to said frame and thereby varies the height of cut.

13. The mower of claim 6 wherein the lead edge of said skid is pivotally connected with said frame for swinging movement about a horizontal axis transverse to the direction of travel, the height of cut of said mower being varied in response to said swinging movement of said skid, said adjusting means being connected to the central portion of the skid as measured along the dimensions of said skid disposed transversely of the direction of travel, said adjusting means constituting the sole means of adjusting said skid and the height of cut of said mower, said adjusting means including a bracket supported by said frame, said bracket having a plurality of vertically spaced holes therein disposed above said skid, said adjusting means further including rod means, said rod means comprising two elongate parts, which are threadedly engaged in end-to-end relationship whereby relative turning between said parts changes the combined overall length of said two parts and varies the height of cut, one of said parts being pivotally connected with said skid, and one end portion of said other part being adapted for selective insertion in said holes to support and maintain said skid in a selected position.

14. A mower comprising:

a frame, cutting means supported by said frame, a ground-engaging support for said frame, said support including a skid elongated transversely of the direction of travel and attached to said frame for sliding contact with the ground, means for adjusting said skid vertically relative to said frame to selectively vary the height of cut of said mower, a frame portion disposed above said skid, said adjusting means extending between and connected with said frame portion and said skid, said adjusting means including first, second, and third parts, successively connected together, one of said parts being connected with said skid, one of said parts being connected with said frame portions, and one of said parts interconnecting the aforementioned parts connected with said frame portion and skid respectively, one of said parts having a plurality of first means, one of said other parts being selectively connectable with said first means to fix the position of the skid and thereby the height of cut of said mower.

15. The mower of claim 14 wherein two of said parts are threadedly connected to each other to provide a second form of adjustment in addition to that provided by the selective engagement of one of said parts with said first means.

16. The mower of claim 14 wherein said support has leading and trailing end portions with respect to the direction of travel, and wherein the leading end portion is pivotally connected with said frame.

17. The mower of claim 14 wherein said first means comprise a vertical series of openings, and wherein said second means selectively engageable therewith are pin means insertable in said openings.

18. A mower comprising:

a frame, cutting means supported by said frame, a ground-engaging support for said frame, said support including a skid connected with said frame for sliding contact with the ground, and means for adjusting the relationship between said skid and said frame to selectively vary the height of cut of said mower, said skid being pivotally connected with said frame for swinging movement about a horizontal axis transverse to the direction of travel, the height of cut of said mower being varied in response to said swinging movement of said skid, said support having leading and trailing end portions with respect to the direction of travel, the leading end portion being pivotally connected with said frame, a first part connected to said frame above said skid and having a vertical series of openings formed therein, a second part pivotally connected with said skid, and a third part having first and second end portions, said first end portion being threadedly engaged with said second part, the second end portion being selectively insertable in one of said openings in said first part.